United States Patent
Miyabe

(10) Patent No.: US 6,487,466 B1
(45) Date of Patent: Nov. 26, 2002

(54) CONTROL SYSTEM WITH SELECTABLE RESET CIRCUIT

(75) Inventor: Kazuaki Miyabe, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 747 days.

(21) Appl. No.: 08/747,967

(22) Filed: Nov. 12, 1996

(30) Foreign Application Priority Data

Jun. 4, 1996 (JP) .............................. 8-141671

(51) Int. Cl.[7] .................................................. G05B 9/02
(52) U.S. Cl. .......................................... 700/82; 700/79
(58) Field of Search .................... 364/483, 492, 364/140, 141, 142, 181, 184, 187, 528.3, 528.31; 700/11, 12, 13, 76, 79, 82, 295, 296

(56) References Cited

U.S. PATENT DOCUMENTS

| | | | | |
|---|---|---|---|---|
| 4,412,267 A | * | 10/1983 | Hansen | 361/94 |
| 4,574,355 A | * | 3/1986 | Beatty et al. | 364/492 |
| 4,739,759 A | * | 4/1988 | Rexroth et al. | 606/37 |
| 4,847,782 A | * | 7/1989 | Brown, Jr. et al. | 364/492 |
| 5,172,094 A | * | 12/1992 | Stadler | 340/426 |
| 5,185,693 A | * | 2/1993 | Loftis et al. | 364/187 |
| 5,202,822 A | * | 4/1993 | McLaughlin et al. | 364/187 |
| 5,313,386 A | * | 5/1994 | Cook et al. | 364/187 |
| 5,349,520 A | * | 9/1994 | Hickman | 701/1 |
| 5,491,625 A | * | 2/1996 | Pressnall et al. | 364/187 |
| 5,506,990 A | * | 4/1996 | Holman, Jr. | 395/750.01 |
| 5,574,520 A | * | 11/1996 | Ishihara | 396/52 |

FOREIGN PATENT DOCUMENTS

| | | | |
|---|---|---|---|
| EP | 0662656 | * | 7/1995 |
| GB | 2241804 | * | 9/1991 |
| JP | 5-303448 | | 11/1993 |

* cited by examiner

Primary Examiner—Eric B. Stamber
(74) Attorney, Agent, or Firm—Sughrue Mion, PLLC

(57) ABSTRACT

A control system includes a switch for selecting whether or not a reset signal is outputted to input/output means, and a reset circuit for directly outputting a reset signal having an implication of "HIGH" to the input/output means when the control means is set to output the reset signal by selecting the switch, and for not outputting the reset signal to the input/output means when the control means is set not to output the reset signal, thereby forcibly drawing the reset signal to "LOW".

14 Claims, 9 Drawing Sheets

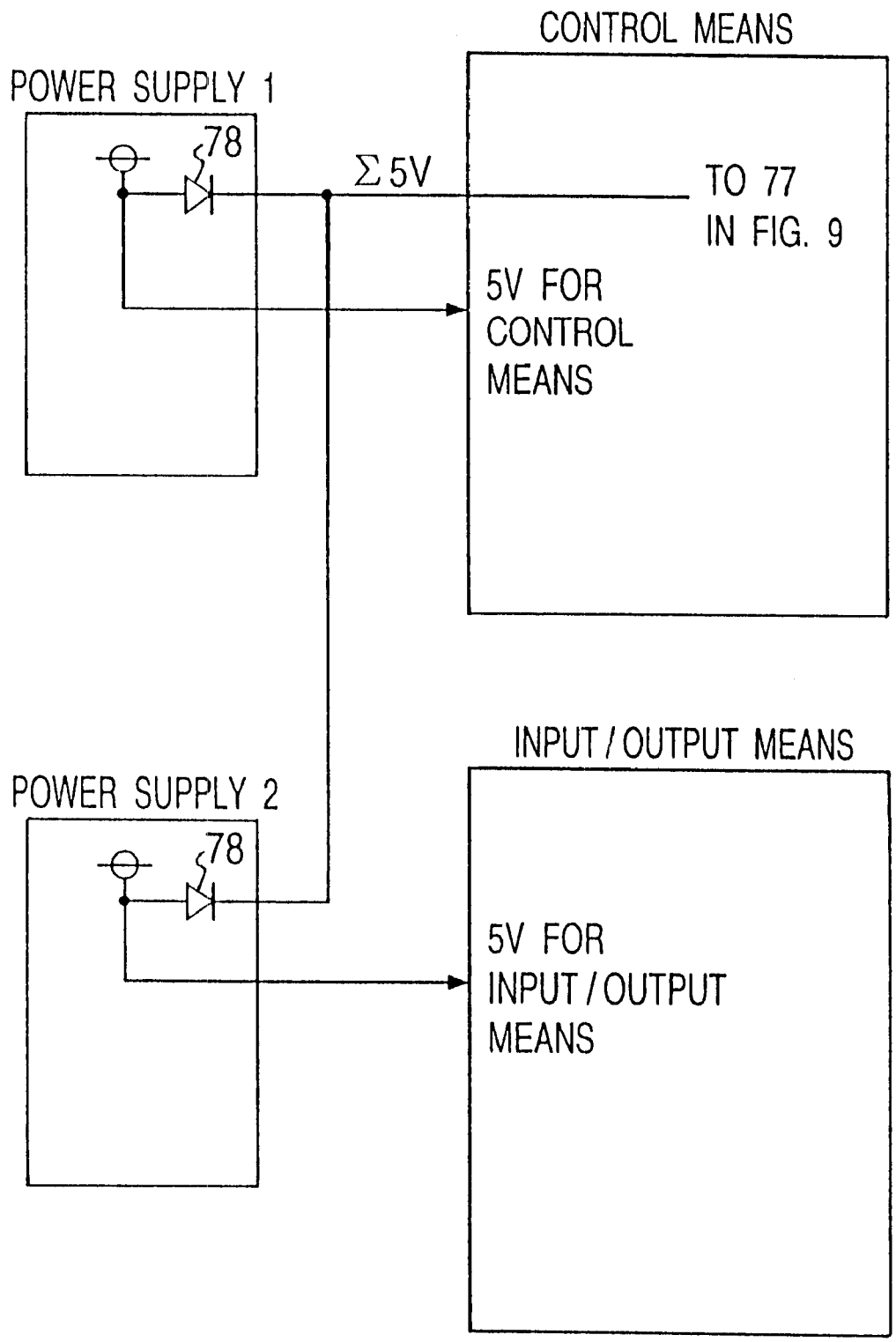

CONTROL SYSTEM WITH SELECTABLE RESET CIRCUIT

BACKGROUND OF THE INVENTION

1. Field of the Invention

The present invention relates to such a control system comprising control means for controlling an entire system, and a plurality of input/output means controlled in response to a reset signal issued from the control means, in which the control system is equipped with a reset circuit for selecting whether or not the reset signal is outputted to the input/output means when the control means is brought into such a condition that this control means cannot control the input/output means.

2. Description of the Related Art

Conventionally, a basic arrangement of a control system such as a programmable controller is made of control means for controlling the overall system, input/output means for interfacing the control means with respect to an external input/output appliance, a power supply for supplying 5V to the control means and the input/output means, and a backplane for fixing the control means and the input/output means to connect signals between the means.

In the above-described control system, for instance, when a failure happens to occur in the control means or the control means recognizes certain malfunctions, the following two cases are conceivable. The case is that all of the outputs from the input/output means are to be cleared. Another case is that conditions occurred immediately before the malfunction are to be held.

For example, a case where all of the outputs from the input/output means are desired to be cleared might exist when controlling a machine in a line. An example of a case where all of the outputs from the input/output means are to be maintained, is a temperature control or air conditioning situation.

FIG. 9 is an example of a reset circuit in one conventional control system. The reset circuit is usable for the control means and input/output means when a failure occurs in or a malfunction is recognized by the control means. In the FIG. 9 system a failure or malfunction cans all of the output to be cleared.

In FIG. 9, reference numeral 71 indicates control means, reference numeral 72 shows an input/output means, and reference numeral 73 is a transistor for drawing a reset signal to the input/output means 72. when the control means 71 is operated under normal condition. Reference numeral 74 represents a reset signal which is outputted from the control means 71 and is wire or gated wired-OR-gated to all of the input/output means 72. Reference numeral 75 is a pull-up resistor, and reference numeral 76 shows an output holding circuit for holding data, which is constructed of a flip-flop.

Also, reference numeral 77 indicated in FIG. 9 is a 5V output (abbreviated as "Σ5V" hereinafter) where a voltage of 5V is defined when even one power supply among a plurality of power supplies of the overall system. Shown in FIG. 10, the 5V outputs of all of the power supplies employed in the control means and the input/output means are coupled with each other by diodes 78.

In the above-described circuit, when a software reset signal; a hardware reset signal, or a power-supply reset signal becomes "LOW", the base of the transistor 73 becomes "LOW", and the reset signal 74 becomes "HIGH" by way of the pull-up resistor 75. The output holding circuit 76 employed inside the input/output means 72 is thereby reset, and all of the outputs from the input/output means 72 are cleared.

Also, even when the power supply of the input/output means 72 is turned ON prior to turning-ON of the power supply of the control means 71, since 5V is defined as Σ5V 77 by FIG. 10, the output holding circuit 76 employed in the input/output means 72 is brought into the reset condition by the pull-up resistor 75. Accordingly, there is no case that the output from the output holding circuit 76 becomes indefinite.

In the circuit disclosed in Japanese Laid-open Patent Application 5-303448, it is possible by the software process operation to select whether or not the input/output means is cleared when the control means is reset.

In this circuit, a latch circuit is employed to select the gate of the output buffer in the signal output circuit module into an active/inactive condition. The latch circuit is set by the software as to whether or not the resetting operation is valid, so that a selection can be made of whether the output is to be cleared or held when the control means is cleared.

The conventional control system is constituted by the above-described arrangement. In the case of the reset circuit example in FIG. 9, for instance, when the hardware reset signal is outputted, since the pull-up resistor 75 employed in the control means 71 becomes "HIGH" and thus all of the input/output means are cleared, the input/output means could not be held by employing the hardware of the same control means. As a consequence the reset circuit could not be used in the control system which holds the latest conditions of the input/output means when a malfunction is recognized.

Also, in another circuit example disclosed in Japanese Laid-open Patent Application No. 5-303448, the latch circuit for selecting the gate of the output buffer into the active/inactive state is required in all of the input/output means provided on the system. Accordingly, the hardware circuits of the input/output means become complex, and the total cost of the system would be increased in espacially when that more than several tens of input/output means are coupled to a single control means.

SUMMARY OF THE INVENTION

The present invention has been made to solve the above-described problems, and has an object to provide a low cost control system with the same hardware arrangement, while conditions of input/output means can be either clear or held when malfunction occur.

To solve the above problems according to the present invention there is provided a control system having a control means for controlling overall system, and a plurality of input/output means for interfacing control means to external input/output appliances, in which the plurality of input/output means are reset in response to a reset signal from the control means. The control means includes a switch for selecting whether or not the reset signal is outputted to to the input/output means, and a reset circuit for directly outputting a reset signal having an implication of "HIGH" to the input/output means when the control means is set to output the reset signal, and for not outputting the reset signal to the input/output means when the control means is set not to output the reset signal, thereby forcibly drawing the reset signal to "LOW".

Another aspect of the present invention involves a control system having two sets of control means, one of which is a controlling system and the other control means constituting a waiting system. This embodiment also has a bus switching means for connecting a bus between the input/output means and any one of the two control means; the two control means and the bus switching means are connected to a backplane. Setting of the switch of the control means is herein invalidated and the reset signal is necessarily outputted to the bus switching means.

Another aspect of the present invention provides a control system with two sets of control means as described above; a bus switching means for selecting between the two sets of control means in response to reset signals derived from the two sets of control means; and a plurality of input/output means for interfacing the control means connected by the bus switching means, with external input/output appliances.

In this embodiment the control means includes: a switch for selecting whether or not the reset signal is outputted to the input/output means; and a reset circuit for directly outputting a reset signal having an implication of "HIGH" to the input/output means when the switch is set to output the reset signal, and for not outputting the reset signal to the input/output means when the switch is set not to output the reset signal, thereby forcibly drawing the reset signal to "LOW".

Another aspect of the present invention is a control system includes: a reset circuit for outputting a reset signal to the input/output means when power supplies of the input/output means are turned ON under certain conditions. For example when the power supply of the control means is turned OFF or when any one of the power supplies of the plural input/output means is turned OFF, the power supply of the control means is recovered, and all of the power to supplies of said plural input/output means are recovered, so that the system can be controlled.

Furthers a reset circuit for outputting a reset signal to the input/output means when the power supply of the input/output means is turned ON in the case that the power supply of the input/output means is recovered from the power down condition.

BRIEF DESCRIPTION OF THE DRAWINGS

The above and other objects and features of the present invention will be more apparent from the following description taken in conjunction with the accompanying drawings.

FIG. 10 is a circuit arrangement of the Σ5V power supply of the control means of FIG. 9.

DETAILED DESCRIPTION OF THE PREFERRED EMBODIMENTS

Now, a description will be given in more detail of the preferred embodiments of the present invention with reference to the accompanying drawings.

Embodiment 1

Figure 1:
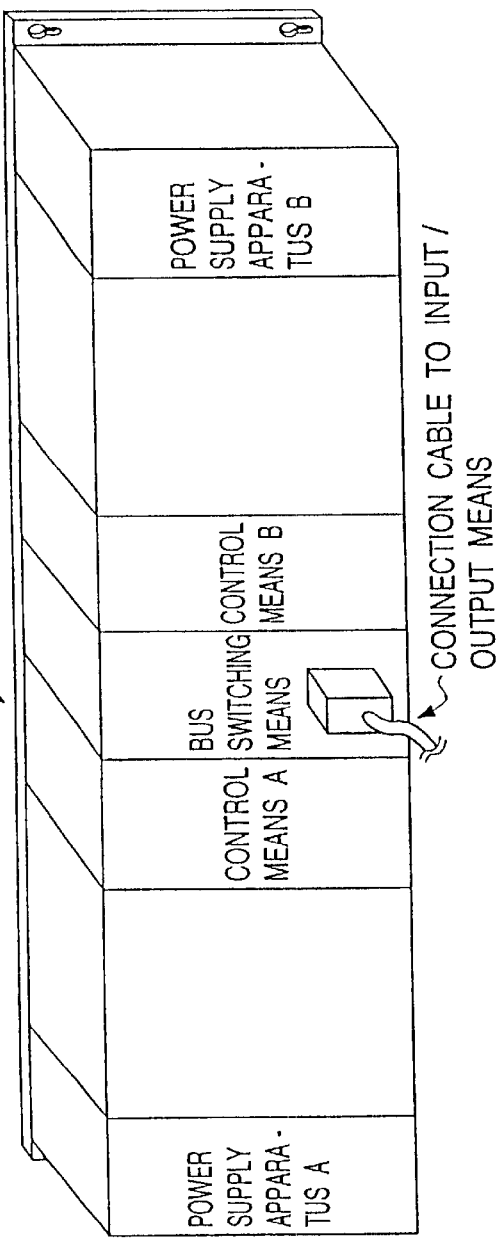
FIG. 1 is a structural diagram for indicating a duplex control system having two sets of control means.

FIG. 1 is one structural example of a duplex control system arranged by two sets of control means.

In FIG. 1, one of control means A and control means B constitutes a control system, and the remaining control means constitutes a waiting system for continuing the control operation when the other malfunctions. A bus switching means causes a bus to an input/output means to be connected to any one of these control means. Since the control means, the bus switching means, and a power supply apparatus are connected to a backplane, signals can be communicated among the respective means and the apparatus.

Figure 2:
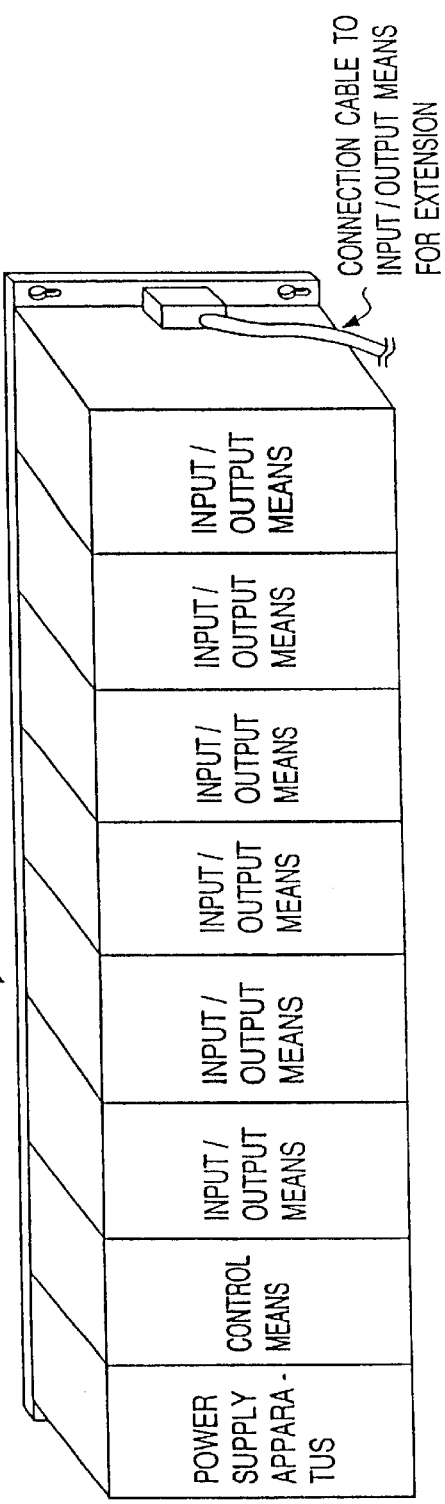
FIG. 2 is a structural diagram for showing a control system for controlling input/output means by a single control means.

FIG. 2 is one structural example of a control system for controlling input/output means by way of a single control means (abbreviated as a "monoplex control system" hereinafter), In this arrangement, the input/output means are controlled by a single control means. Although the reliability of this monoplex control system is lower than that of the control system shown in FIG. 1, since only one control means is employed, this embodiment is less expensive.

As a consequence, there are many cases where either the system arrangement of FIG. 1 or the system arrangement of FIG. 2 is separately utilized, depending upon the necessities. Considering the maintenance characteristics, it is desirable to construct the control means and the power supply apparatus by employing commonly used hardware and software.

Figure 3:
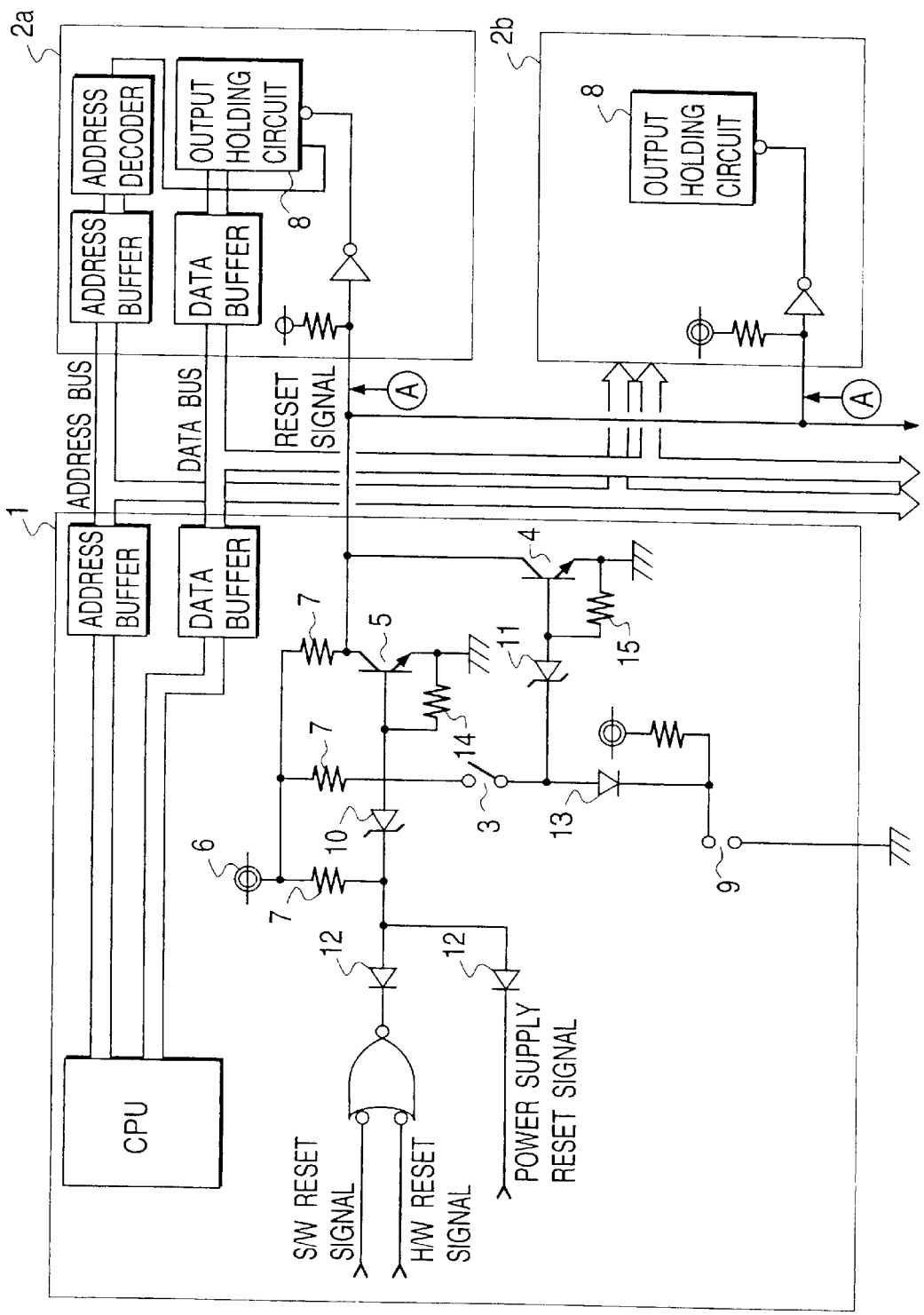
FIG. 3 is a structural diagram for denoting a control system according to an embodiment 1 of the present invention.

FIG. 3 is a structural diagram for representing a control system according to an embodiment 1 of the present invention.

In FIG. 3, reference numeral 1 indicates a control means, reference numerals 2a and 2b denote input/output means, and reference numeral 3 shows a switch used to set whether the input/output means 2 is cleared, or held when the control means 1 outputs a reset signal. When the switch 3 is turned ON, this switch 3 is brought into the holding state. Reference numeral 4 indicates a transistor for drawing the reset signal to "LOW" when the switch 3 is turned ON, reference numeral 5 is a transistor for driving the reset signal, reference numeral 6 indicates Σ5V, and reference numeral 7 denotes a pull-up resistor. Also, reference numeral 8 represents an output holding circuit for holding a state of the input/output means 2a, 2b and reference numeral 9 is a connector to the backplane. Since the connector 9 is clamped at LOW only when the connector 9 is connected to the backplane for the duplex control system, the base of the transistor 4 becomes LOW.

Reference numerals 10 and 11 indicate zener diodes for maintaining a constant voltage, reference numerals 12 and 13 represent diodes for blocking reverse currents, and reference numerals 14 and 15 show bypass resistors between the base and the emitter of the transistor.

Referring to FIG. 3, when the control means is mounted on the backplane for the monoplex control system, the software reset signal, the hardware reset signal, and the power supply reset signal are outputted when switch 3 is in the OFF position the base of the transistor 4 then becomes LOW, and the output holding circuit 8 is reset by the pull-up resistor 7. Accordingly, the output to the external appliance is cleared.

Next, under such a condition that the control means 1 is mounted to the backplane for the monoplex control system and the switch 3 is turned ON, the base of the transistor 4 becomes HIGH, and the collector of the transistor 4 is drawn to LOW. As a result, even when the reset signal is outputted, the external reset signal remains LOW and the condition of the output holding circuit 8 is still maintained.

Figure 9:
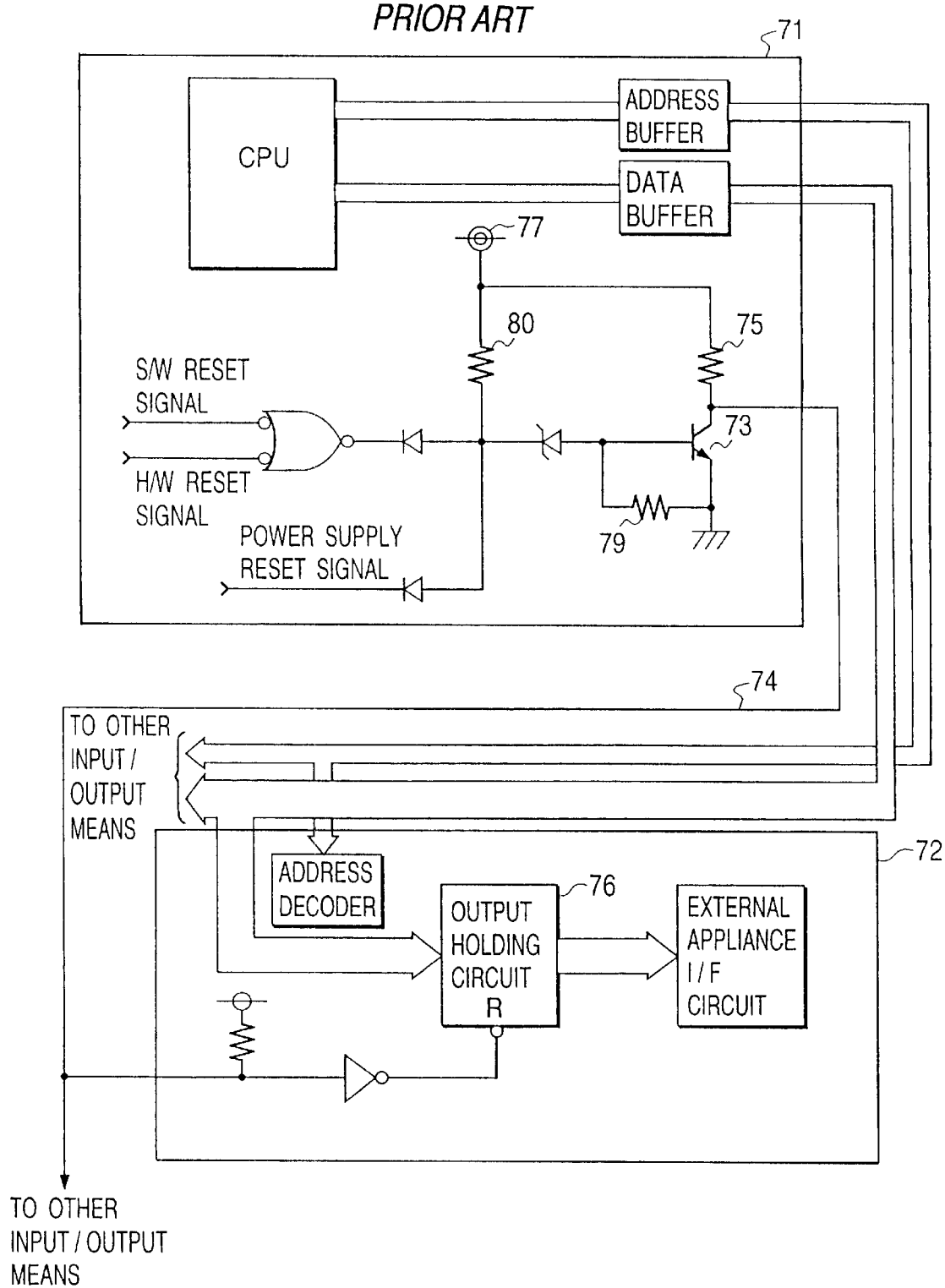
FIG. 9 is a structural diagram for indicating the conventional control system.

In accordance with the above-explained circuit arrangement, since the switch 3, the transistor 4, the zener diode it, and the bypass resistor 15 are additionally provided with the circuit arrangement of FIG. 9 in the conventional control system, the circuit arrangement of this embodiment may be applied to control system which output the reset signal to clear the latest conditions, as well as control systems which do not output reset signals (i.e., which hold the latest conditions). Also, since the control means 1 has a circuit capable of determining whether or not the reset signal is outputted not to the input/output means 2a, 2b, but only to the control means 1, even when a plurality of input/output means 2a, 2b are provided with the control means 1, there is no need for such a selection circuit in the input/output means 2a, 2b. As a consequence, the total cost of this control system can be reduced.

Embodiment 2

Figure 4:
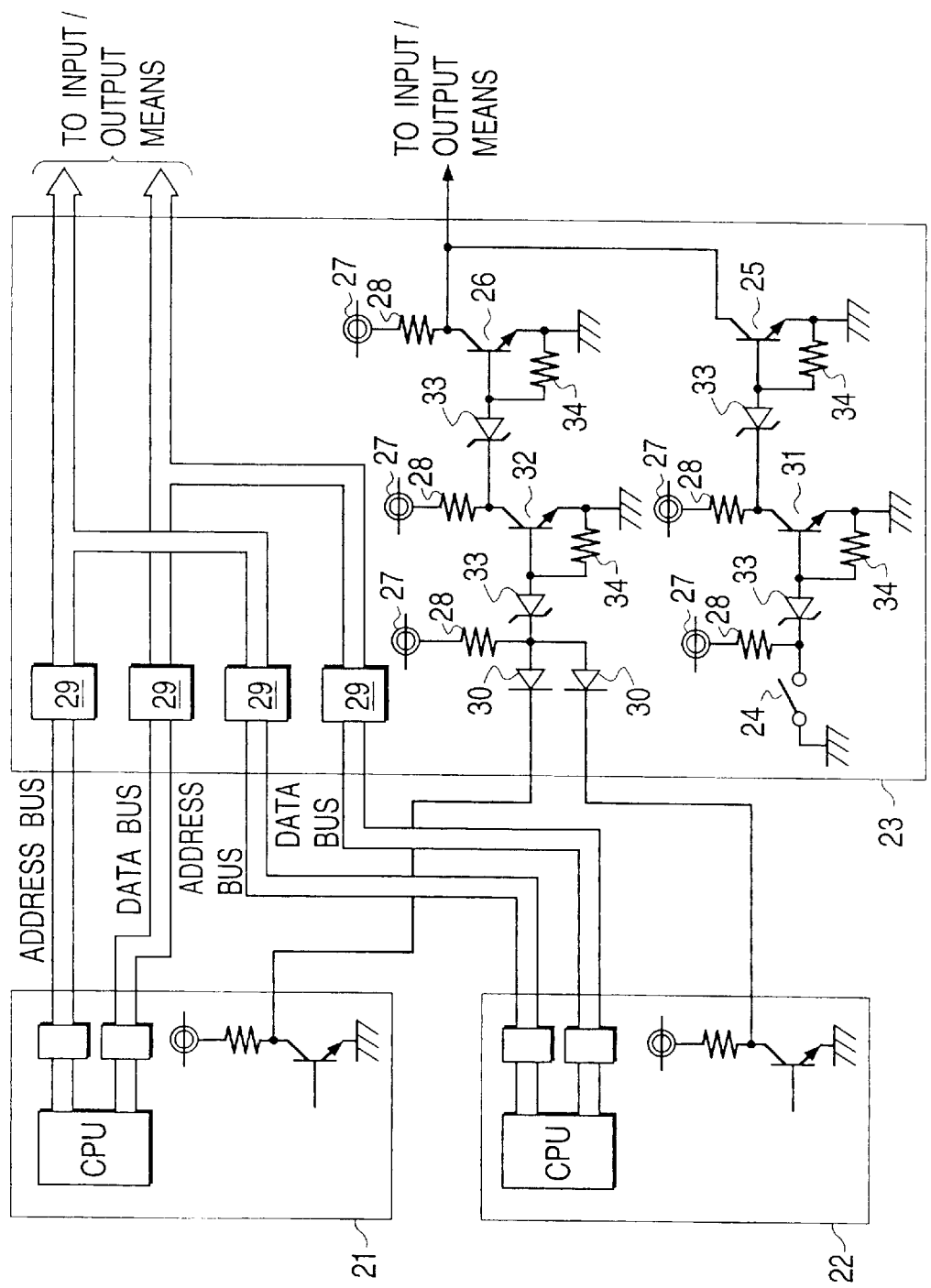
FIG. 4 is a structural diagram for representing a control system according to an embodiment 2 of the present invention.

FIG. 4 is a structural diagram for indicating a control system according to an embodiment 2 of the present invention.

With reference to FIG. 4 and FIG. 3, a description will now be made of such a case that this embodiment 2 is applied to a waiting redundancy type control system in which two sets of control means are utilized, and one set of plural input/output means is employed.

In FIG. 4, reference numerals 21 and 22 indicate control means with H/W arrangements shown in FIG. 3. One of these control means controls the input/output means, and the other control means corresponds to a waiting system. Reference numeral 23 is a bus switching means which allows one of these control means to be connected to the bus to the input/output means, the bus is switched to the control means when the other control means outputs the reset signal.

Reference numeral 24 denotes a switch for setting whether the input/output means 23 is cleared or held when the control means 21 and 22 output the reset signals. When the switch 24 is turned ON, the holding state is established. Reference numeral 25 is a transistor for drawing the reset signal to "LOW" when the switch 24 is turned ON, reference numeral 26 shows another transistor for driving the reset signal, reference numeral 27 indicates Σ5V, reference numeral 28 shows a pull-up resistor, and reference numeral 29 denotes a buffering IC of the bus. Also, reference numeral 30 is a diode for blocking a reverse current, reference numeral 31 shows a transistor for drawing a collector thereof to LOW when the switch 24 is turned OFF, reference numeral 32 indicates a transistor for drawing a collector thereof to LOW when both the transistors of the control means 21 and 22 become HIGH, reference numeral 33 shows a zener diode for maintaining a constant voltages and reference numeral 34 denotes a bypass resistor for a base-to-emitter path of a transistor.

In the duplex control system which has two sets of control means shown in FIG. 1, the connector 9 (see FIG. 3) is clamped at a LOW level, and the base of the transistor 4 becomes LOW irrelevant to the switching condition of the switch 3. As a result, the reset signals are issued from the control means 21 and 22 of FIG. 4 to the bus switching means 23.

Accordingly, the input/output means which wants to interrupt the control in synchronism with each of the control means fetches this reset signal to thereby be cleared.

Next, operations of the bus switching means 23 will be explained. In the case of waiting redundancy system, when both of control means 21 and 22 are brought into non-control conditions, the input/output means is firstly brought into the holding state or the clear state.

For instance, in FIG. 4, when the control operation by the control means 21 is no longer continued, and the reset signal becomes HIGH in order to clear the input/output means by the control means 21, if the control operation by the control means 22 can still be continued, then the voltage level of the diode 30 on the anode side becomes LOW, because the reset signal derived from the control means 22 is LOW. As a result, the collector side of the transistor 26 is drawn to LOW, and no reset signal is issued from the bus switching means 23 to the input/output means, irrelevant to the switching condition of the switch 24, and the address bus is connected with the control means, so that the input/output means can be continuously controlled by this control means 22.

Furthermore, another description will now be made of a case wherein the control operation by the control means 22 cannot be continued, while the reset signal derived from the control means 21 is HIGH.

At this time, since the reset signal from the control means 22 is changed from LOW to HIGH, the voltage at the anode the diode 30 becomes HIGH, so that the collector of the transistor 32 is drawn LOW.

Therefore, when the switch 24 employed in the bus witching means 23 is turned OFF, the transistor 26 is not drawn LOW, but the pull-up resistor 28 can be operated, so hat a reset-HIGH signal is externally outputted. When the witch 24 is turned ON, the collector of the transistor 25 is drawn LOW, and no reset operation is effected to the input/output means even if the reset signals are issued from two sets of control means 21 and 22.

It should be noted that when the resetting operation of the control means 21 is released from a condition wherein the reset signal is outputted from the control means. 21 up to another condition that the reset signals are issued from both the control means 21 and 22, the control means 21 continuously controls the input/output means in response to the reset signal issued from the control means 22.

It should also be noted that a similar operation to the above-explained operation is carried out even when the function of the control means 21 is replaced by that of the control means 22 in the embodiment 2.

The above-described circuit arrangement may be applied to any one of the control systems for outputting the reset signal of the control means to the input/output means, and the control system not for outputting such a reset signal. Also, such a resetting circuit is provided not with the input/output means, but with the bus switching means. The total cost can be lowered even when the control means controls a plurality of input/output means.

Also, when this circuit arrangement is applied to the system arrangement of the embodiment 1, control means may be commonly utilized.

Embodiment 3

Figure 5:
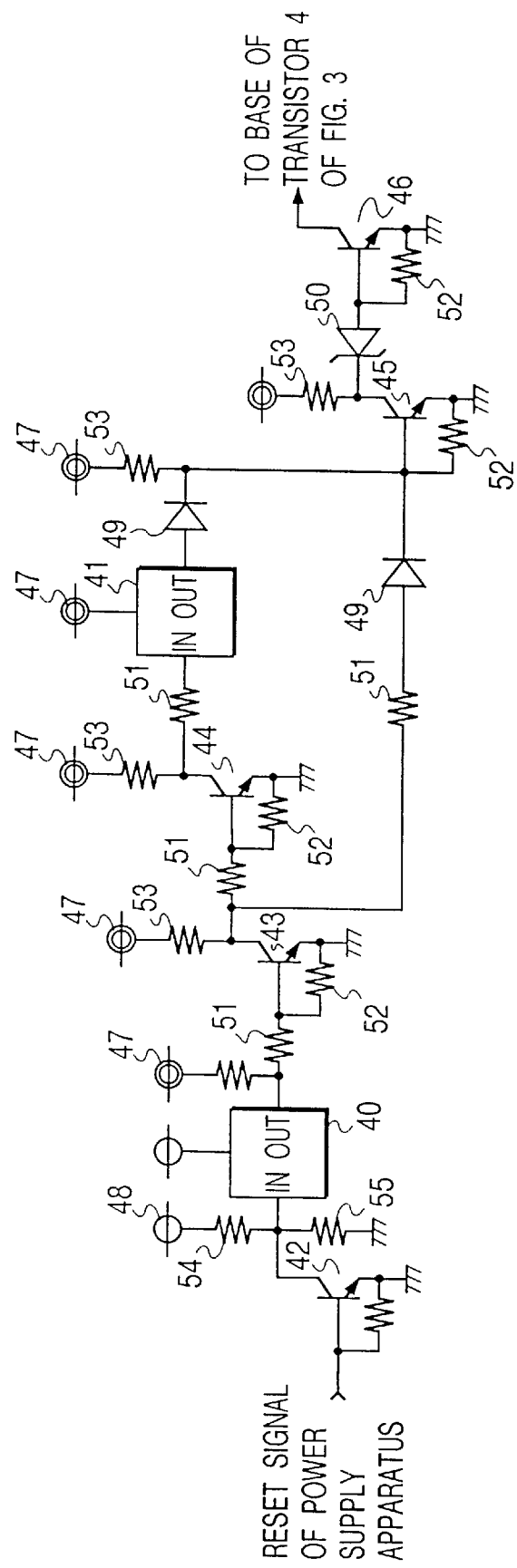
FIG. 5 is a structural diagram for showing a reset circuit of a control system according to an embodiment 3 of the present invention.
Figure 6:
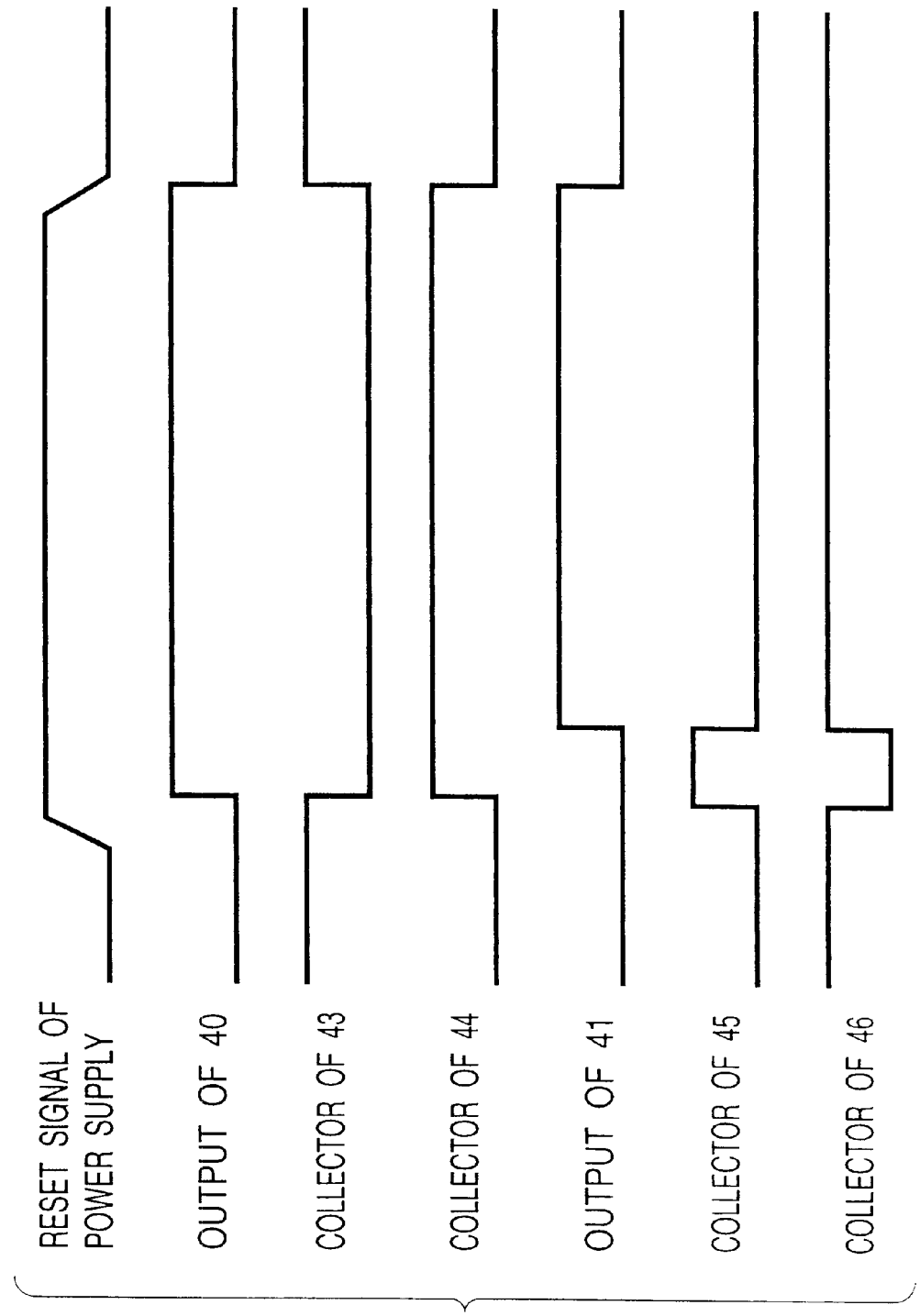
FIG. 6 shows an operation timing of the reset circuit of FIG. 5.

FIG. 5 is a structural diagram for showing a reset circuit of a control system according to a third embodiment of the present invention. FIG. 6 represents an operation timing diagram of the reset circuit in FIG. 5.

In FIG. 5, reference numerals 40 and 41 denote reset ICs operated so that when an input thereof becomes HIGH, an output thereof becomes HIGH after a preselected delay time. Reference numeral 42 represents a transistor for drawing an input signal to the reset IC 40 into LOW when a reset signal of a power supply becomes HIGH. Reference numeral 43 is another transistor whose collector is drawn to LOW when the output of the reset IC 40 becomes HIGH, and reference numeral 44 indicates another transistor for drawing an input signal to the reset IC 41 into LOW when the collector of the transistor 43 becomes HIGH.

Reference numeral 45 is a transistor whose collector is drawn to LOW in any case other than the outputs. from the collector of the transistor 43 and from the reset IC 41 being LOW. Reference numeral 46 is a transistor for drawing the reset signal to LOW in response to the output from the transistor 45, reference numeral 47 is Σ5V, reference numeral 48 shows 5V of control means, and reference numeral 49 denotes a diode for blocking a reverse current. Also, reference numeral 50 shows a zener diode for maintaining a constant voltage, reference numeral 51 shows a limit resistor, reference numeral 52 indicates a bypass resistor for a base-to-emitter path of a transistor, reference numeral 53 is a pull-up resistor, and reference numerals 54 and 55 denote resistors for determining a detection level of the reset IC. A reset signal of a power supply connected to the base of the transistor 42 corresponds to a signal which is released when 5V of the all power supplies of input/output means is defined.

In FIG. 6, when the control means of 5V is indicated and the reset signal of the power supply is released, the output of the reset IC 40 of FIG. 5 becomes HIGH after a preselected delay time.

At this time, the operation timings of the transistors 43 and 44 are indicated in FIG. 6, and the output of the reset IC 41 becomes HIGH after a preselected delay time. Accordingly, since no base current of the transistor 45 flows only when both the transistor 43 and the reset IC 41 become LOW, the collector thereof becomes HIGH only this time, so that the collector of the transistor 46 represents such a waveform of FIG. 6.

Next, a description will now be made of another case where the reset circuit indicated in FIG. 5 is connected in parallel to the base of the transistor 4 shown in FIG. 3.

In the above-described circuit arrangement of FIG. 3, when the power supply of the control means 1 is turned ON under condition that the switch 3 is turned ON, the reset signal is drawn LOW by the transistor 4, and then the output holding circuit 8 employed in the input/output means 2 is not brought into the reset state. As a consequence, the output of the output holding circuit 8 becomes unstable. Therefore; when the power supply is turned ON, the switch 3 must be under OFF state.

To the contrary, when the reset circuit of FIG. 5 is connected in parallel to the base of the transistor 4 of FIG. 3, while the transistor 46 is LOW, the reset signal is not drawn to LOW by the transistor 4 at the same time when the power supply of the input/output means 2 is initiated, and the output holding circuit 8 of the input/output means 2 can be reset.

Similarly, when the reset circuit shown in FIG. 5 is connected in parallel to the base of the transistor 25 of the bus switching means 23 indicated in FIG. 4, the reset signal shown in FIG. 6 is outputted to the output holding circuit of the input/output means.

As a consequence, the reset circuit arrangement of FIG. 5 is combined with the circuit arrangements of FIG. 3 and FIG. 4, so that the system can be initiated when the power supply is turned ON irrelevant to the switching conditions of the switch 3 and the switch 4.

Embodiment 4

Figure 7:
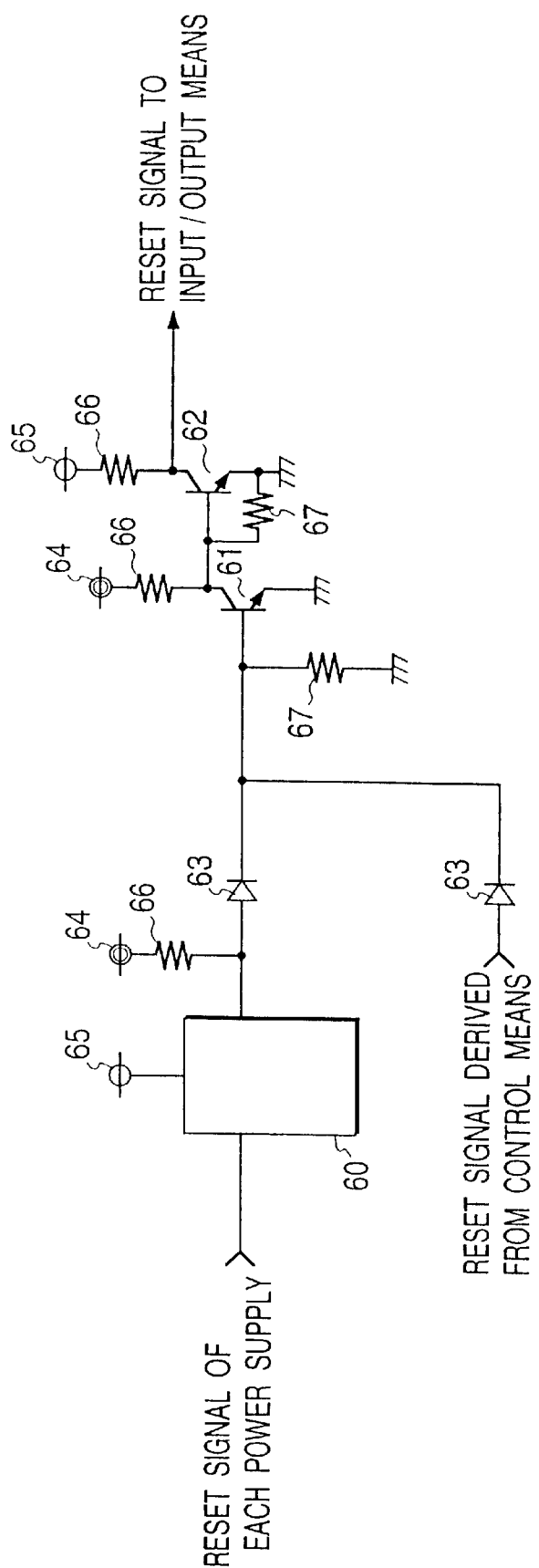
FIG. 7 is a structural diagram for showing a reset circuit of a control system according to an embodiment 4 of the present intention.
Figure 8:
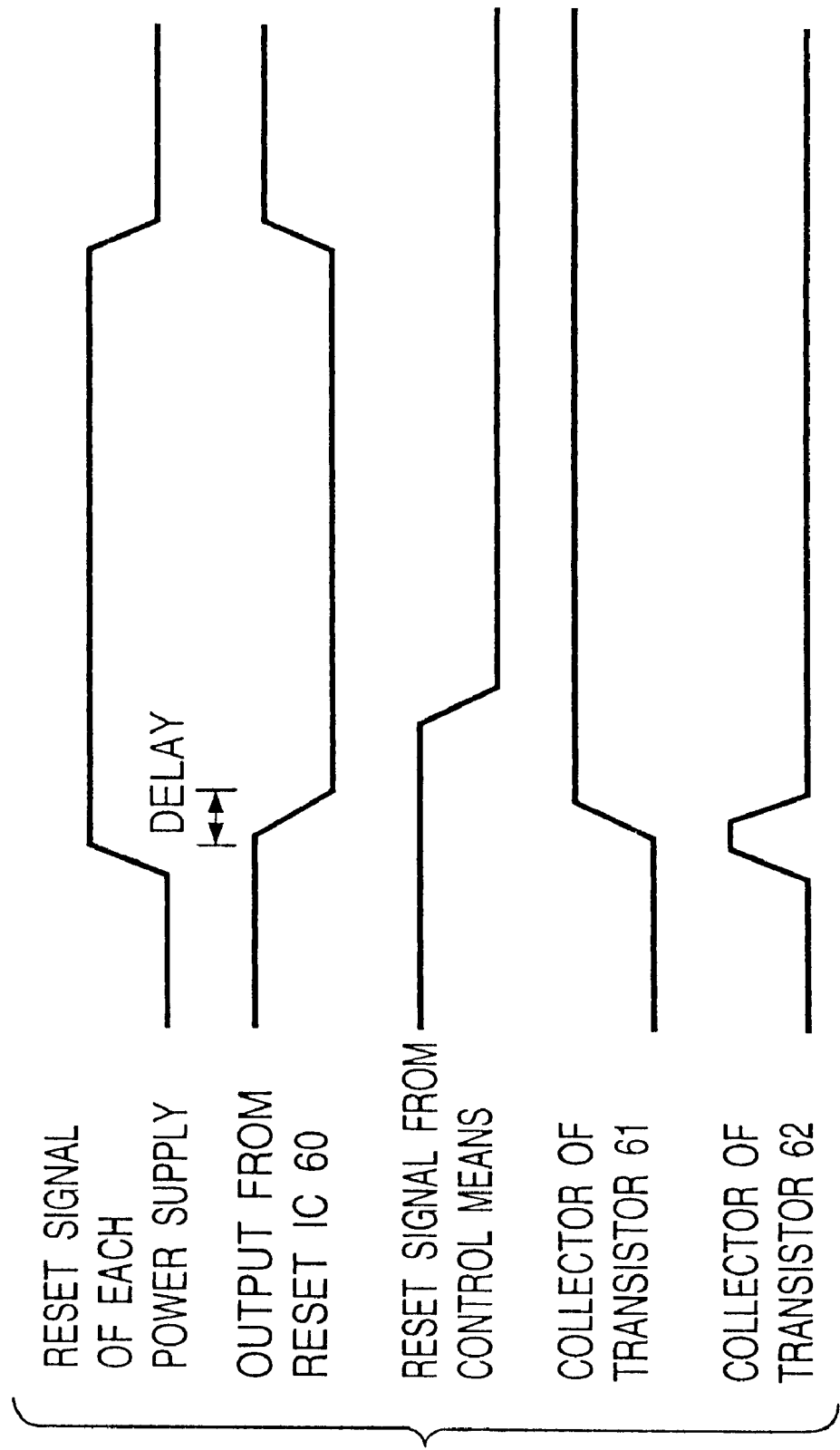
FIG. 8 shows an operation timing of the reset circuit of FIG. 7.

FIG. 7 is a structural diagram for indicating a reset circuit of a control system according to a fourth embodiment of the present invention. This reset circuit may be applied to a control system when there are plural power supplies for applying 5V to the input/output means. FIG. 8 is a timing chart of the reset circuit of FIG. 7.

In FIG. 7, reference numeral 60 shows a reset IC operated so that when an input thereof becomes HIGH, an output thereof becomes LOW after a preselected delay time. Reference numerals 61 and 62 are transistors, reference numeral 63 indicates a diode for blocking a reverse current, reference numeral 64 is Σ5V, reference numeral 65 represents a power supply voltage of 5V of a means into which this reset circuit is assembled, reference numeral 66 shows a pull-up resistor, and reference numeral 67 represents a bypass resistor for a base-to-emitter path of a transistor.

It is now assumed that such an input signal which becomes HIGH from LOW when the power supply is turned ON is entered into the reset IC 60, and such a reset signal derived from the collector of the transistor 5 of the control means 1 shown in FIG. 3 is entered therein as the reset signal from the control means.

Next, operations of the reset circuit, of FIG. 7 will now be explained with reference to FIG. 8.

When the power supply of each of the input/output means is turned ON, the reset signal becomes HIGH, so that resetting of the power supply is released. As a result, the reset IC 60 becomes LOW after a preselected delay time. Accordingly, the collectors of the transistors 61 and 62 are varied at timings as indicated in FIG. 8.

Referring now to FIG. 3 and FIG. 7, such a control system will be explained in which 5V of the input/output means 2a and 2b shown in FIG. 3 are applied from the separate power supplies.

In such a case that a plurality of power supplies are present, when the switch 3 of FIG. 3 is turned OFF to cause the power supplies of the control means 1 and the input/output means 2a to be turned ON and also the power supply of the input/output means 2b to be turned OFF, the output holding circuit 8 is reset by way of the pull-up resistor 7.

Next t under such a condition that the switch 3 is turned ON to cause the power supplies of the control means 1 and the input/output means 2a to be turned ON, and the power supply of the input/output means 2b to be turned OFF, the reset signal of the power supply shown in FIG. 5 is not released, but also the output holding circuit is not reset. As a result, the output becomes unstable. Thus, when attempts are made to be turned on the power supplies of the power supply means all of these power supplies should be turned ON at the same time, or the switch 3 must be turned OFF to thereby turn ON the power supplies.

Subsequently, a description will now be made of another control system in which the reset circuit of FIG. 7 is inserted to a point "A" of FIG. 3. At this time, since the collector of the transistor 62 shown in FIG. 7 is connected to the output holding circuit of the input/output means, all of the power supplies are turned ON, so that even when the reset circuit of FIG. 5 is not operated, the power supply of the respective input/output means is turned ON. Accordingly, the reset signal is outputted to the input/output means whose power supply is turned ON, irrelevant to the switching condition of the switch 3.

As previously explained, since the control system of FIG. 3 is combined with the reset circuits of FIG. 5 and FIG. 7, even when the power supplies of the plural input/output means are turned ON, all of the output holding circuits of the input/output means can be reset, so that the outputs are not unstable.

Instead of the control system shown in FIG. 3, the control system of FIG. 4 may be combined with these reset circuits.

As previously described, according to one aspect of the present invention, in the control system comprising control means for controlling an overall system, and a plurality of input/output means for interfacing said control means with respect to external input/output appliances, in which said plurality of input/output means are reset in response to a reset signal from said control means, this control means includes a switch for selecting whether or not the reset signal is outputted to said input/output means; and a reset circuit for directly outputting a reset signal having an implication of "HIGH" to said input/output means when said control means is set to output the reset signal by selecting said switch, and for not outputting the reset signal to said input/output means when said control means is set not to output the reset signal, thereby forcibly drawing the reset signal to "LOW". There is an advantage that this control system can be applied to-both a control system for outputting the reset signal of the control means to the input/output means without modifying the software, and another control system for not outputting the reset signal to the input/output means.

Also, there is another effect that the control system can be inexpensively made even when a plurality of input/output means are provided with a single control means, because the reset circuit is employed only in the control means, not in the input/output means.

Further, in the control system according to another aspect of the present invention; this control system comprises two sets of control means, one of which control systems constituting a controlling system and the other control system constituting a waiting system; and bus switching means for connecting a bus to the input/output means with any one of said two control means, while said two control means and said bus switching means are connected to a backplane; setting of the switch of said control means is invalidated; and the reset signal is necessarily outputted to said bus switching means. Accordingly, such an input/output means whose control operation is wanted to be stopped in synchronism with the respective control means will fetch the above-explained reset signal, so that this input/output means is cleared.

Also, according to another aspect of the present invention, in a control system comprising two sets of control means for controlling an overall system, one of which constitutes a controlling system and the other of which constitutes a waiting system; bus switching means for switching a control right between two sets of control means in response to reset signals derived from the two sets of control means; and a plurality of input/output means for interfacing the control means connected by the bus switching means with respect to external input/output appliances, this control means includes:. a switch for selecting whether or not the reset signal is outputted to said input/output means; and a reset circuit for directly outputting a reset signal having an implication of "HIGH" to said input/output means when this switch is set to output the reset signals and for not outputting the reset signal to said input/output means when said switch is set not to output the reset signals thereby forcibly drawing the reset signal to "LOW". As a result, this control system can be applied to any of such a system in which the reset signal of the control means is outputted to the input/output means, and another system in which the reset signal is not outputted to the input/output means. There is an advantage that the control system can be constructed in low cost even when the reset circuit is provided not with the input/output means, but only with the bus switching means* and each of the control means processes a plurality of input/output means.

Further, according to another aspect of the present invention, the control system includes: a reset circuit for outputting a reset signal to said input/output means when power supplies of said input/output means are turned ON under such a condition that either when the power supply of the control means is turned OFF or when any one of the power supplies of said plural input/output means is turned OFF, the power supply of said control means is recovered, and all of the power supplies of said plural input/output means are recovered, so that the system can be controlled. Therefore, the control system can be initiated when the power supply is turned ON, irrelevant to the switching condition of the switch for selecting whether the reset signal from the control means or the bus switching means is delivered to the input/output means.

Also, according to a further aspect of the present invention, in the control system, a reset circuit outputs a reset signal to the input/output means when the power supply of said input/output means is recovered from the power down conditions. As a result, even when the power supplies of the plural input/output means are successively turned ON at various times, all of these input /output means can be reset, so that the outputs thereof do not become indefinite.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A control system, comprising:
   control means for controlling an overall system, said control means generating and outputting a reset signal based on the occurrence of at least one reset-condition; and
   a plurality of input/output means for interfacing appliances, said plurality of input/output means being reset in response to the reset signal from said control means;
   wherein said control means includes:
      a switch for selecting whether or not the reset signal is outputted to said plurality of input/output means; and
      a reset circuit for directly outputting a reset signal having a "HIGH" level to said plurality of input/output means when said control means is set to output the reset signal by selecting said switch, and for not outputting the reset signal to said plurality of input/output means when said control means is set not to output the reset signal thereby changing the reset signal to "LOW"; and a backup control means for controlling said overall system at a time when said control means does not control said overall system; and a bus switching means for controlling a bus to connect the plurality of input/output means with one of said control means and said backup control means, said control means, said backup control means, and said bus switching means being connected to a backplane;

wherein the selection of the switch of said control means is overridden so that the reset signal is necessarily outputted to said bus switching means.

2. A control system according to claim 1, wherein said bus switching means selects whether the reset signal is output to said plurality of input/output means.

3. A control system, comprising:

control means for controlling an overall system, said control means generating and outputting a reset signal based on the occurrence of at least one reset-condition; and a plurality of input/output means for interfacing appliances, said plurality of input/output means being reset in response to the reset signal from said control means;

wherein said control means includes:
a switch for selecting whether or not the reset signal is outputted to said plurality of input/output means; and
a reset circuit for directly outputting a reset signal having a "HIGH" level to said plurality of input/output means when said control means is set to output the reset signal by selecting said switch, and for not outputting the reset signal to said plurality of input/output means when said control means is set not to output the reset signal thereby changing the reset signal to "LOW"; and wherein said control means outputs a reset signal to said plurality of input/output means when power supplies of said plurality of input/output means are turned ON after power supplies for said control means or one of said input/output means have been turned OFF and then ON, so that the system can be reset and controlled.

4. A control system as claimed in claim 3 further comprising an additional reset circuit for outputting a reset signal to at least one of said plurality of input/output means when the power supply of one of said plurality of input/output means is turned ON in the case that the power supply of said one of said plurality of input/output means is recovered from the power down condition.

5. A control system according to claim 4, wherein said additional reset circuit is located at said one of said plurality of input/output means.

6. A control system for controlling at least one separate device through an input/output interface, said control system comprising:

a central controller having a reset circuit which generates a reset signal based upon the occurrence of at least one predetermined condition, said reset circuit including:
a switch for selecting whether or not the generated reset signal is to be outputted to said input/output interface;
wherein said reset signal is used to reset said central controller regardless of the position of said switch.

7. A control system for controlling at least one separate device through an input/output interface, said control system comprising:

a central controller having a reset circuit which generates a reset signal based upon the occurrence of at least one predetermined condition, said reset circuit including:
a switch for selecting whether or not the generated reset signal is to be outputted to said input/output interface; and said control system further comprising:
a backup central controller which controls said device at a time when said central controller does not control said device; and
a bus switch connected to said input/output interface, said central controller, and said backup central controller, said bus switch operative to select between and connect one of the central controller and the backup central controller to the input/output interface;
wherein the selection in said central controller is overridden so that said generated reset signal is output to said bus switch.

8. A control system according to claim 7, wherein said bus switch determines whether said reset signal is to be output to said input/output interface.

9. A control system for controlling at least one separate device through an input/output interface, said control system comprising:

a central controller having a reset circuit which generates a reset signal based upon the occurrence of at least one predetermined condition, said reset circuit including:
a switch for selecting whether or not the generated reset signal is to be outputted to said input/output interface; and said control system further comprising:
power supplies for providing electrical power to said controller, said input/output interface, and said device;
a second circuit operable to ensure that said reset signal can be output to said input/output interface even while one of said power supplies is being reset.

10. A control system according to claim 9, wherein said second circuit inputs a power supply reset signal from a power supply that is being reset, derives a delayed version of said power supply reset signal, and uses said delayed version of said power supply reset signal to ensure that said reset signal can be output to said input/output interface even while said power supply is being reset.

11. A control system according to claim 9, further comprising:

a backup central controller which controls said device at a time when said central controller does not control said device;
a bus switch connected to said input/output interface, said central controller, and said backup central controller, said bus switch operative to select between and connect one of the central controller and the backup central controller to the input/output interface; and
power supplies for said backup central controller and said bus switch;
wherein the selection in said central controller is overridden so that said generated reset signal is output to said bus switch, and said bus switch determines whether said reset signal is to be output to said input/output interface.

12. A control system for controlling at least one separate device through an input/output interface, said control system comprising:

a central controller having a reset circuit which generates a reset signal based upon the occurrence of at least one predetermined condition, said reset circuit including:
a switch for selecting whether or not the generated reset signal is to be outputted to said input/output interface; and said control system further comprising:
at least one power supply for providing electrical power to said controller, said input/output interface, and said device, said power supply outputting a power supply reset signal while resetting; and
an input/output interface reset circuit operable to ensure that said input/output interface can be reset by said reset signal even during the time that said power supply is resetting.

13. A control system for controlling at least one separate device through an input/output interface, said control system comprising:

a central controller having a reset circuit which generates a reset signal based upon the occurrence of at least one predetermined condition, said reset circuit including:
a switch for selecting whether or not the generated reset signal is to be outputted to said input/output interface; and said control system further comprising:
power supplies for providing electrical power to said controller, said input/output interface, and said device, each of said power supplies outputting a power supply reset signal while resetting;
a second circuit operable to combine said power supply reset signals and said reset signal from said central controller reset said input/output interface when any one of said reset and said power supply reset signals is activated.

14. A control system according to claim 13, wherein said second circuit is located at said input/output interface.

* * * * *